US012618634B2

(12) United States Patent
Xu

(10) Patent No.: US 12,618,634 B2
(45) Date of Patent: May 5, 2026

(54) MUZZLE FLASH SIMULATOR AND METHOD FOR GENERATING LIGHT TRAIL

(71) Applicant: Sangtian Technology(Shenzhen) Co., Ltd., Shenzhen City (CN)

(72) Inventor: Shuxi Xu, Shenzhen City (CN)

(73) Assignee: SANGTIAN TECHNOLOGY(SHENZHEN) CO., LTD., Shenzhen City (CN)

( * ) Notice: Subject to any disclaimer, the term of this patent is extended or adjusted under 35 U.S.C. 154(b) by 359 days.

(21) Appl. No.: 18/230,764

(22) Filed: Aug. 7, 2023

(65) Prior Publication Data

US 2024/0393074 A1 Nov. 28, 2024

(30) Foreign Application Priority Data

May 27, 2023 (CN) ........................ 202310613377.3

(51) Int. Cl.
*F41A 33/02* (2006.01)
*F21S 10/04* (2006.01)
(Continued)

(52) U.S. Cl.
CPC ............. *F41A 33/02* (2013.01); *F21S 10/043* (2013.01); *F21V 23/0442* (2013.01);
(Continued)

(58) Field of Classification Search
CPC ....... F41A 33/02; H05B 47/105; H05B 47/16; A63F 9/0291; A63F 9/0278; A63F 13/21; A63F 13/42
See application file for complete search history.

(56) References Cited

U.S. PATENT DOCUMENTS 9,746,272 B2 * 8/2017 Lowrance ............... F41A 33/02
10,041,757 B2 * 8/2018 Grossnickle ............ F41B 6/003
(Continued)

FOREIGN PATENT DOCUMENTS

CN 102671395 A 9/2012
CN 108716641 A 10/2018

OTHER PUBLICATIONS

Notice of Examination Opinions dated Dec. 4, 2023 received in Taiwanese Patent Application No. 112130485.

*Primary Examiner* — James S. McClellan
(74) *Attorney, Agent, or Firm* — Scully, Scott, Murphy & Presser, P.C.

(57) ABSTRACT

Disclosed are a muzzle flame simulator and a method for generating a light trail. The muzzle flame simulator includes a projectile passage, a projectile sensor, a controller, and at least one simulating flame light source. The projectile passage is disposed inside the muzzle flame simulator. The projectile sensor is coupled to the controller and configured to send a trigger signal to the controller in response to detecting a projectile passing through the projectile passage. The controller includes a signal generator circuit, which is configured to output at least two preset periodically changing control signals. The controller is configured to start the signal generator circuit in response to detecting the trigger signal. The at least one simulating flame light source is coupled to the controller, the simulating flame light source each at least includes two illuminating components that are configured to periodically emit light based on the control signals.

14 Claims, 10 Drawing Sheets

(51) Int. Cl.

| | |
|---|---|
| ***F21V 23/04*** | (2006.01) |
| ***F21V 33/00*** | (2006.01) |
| *F21Y 113/13* | (2016.01) |
| *F21Y 115/10* | (2016.01) |
| *F41B 11/71* | (2013.01) |

(52) U.S. Cl.
CPC ......... *F21V 33/008* (2013.01); *F21Y 2113/13* (2016.08); *F21Y 2115/10* (2016.08); *F41B 11/71* (2013.01)

(56) References Cited

U.S. PATENT DOCUMENTS

| | | | | |
|---|---|---|---|---|
| 2009/0197506 | A1 | 8/2009 | Ma | |
| 2018/0163949 | A1* | 6/2018 | Joseph ................ | F21V 23/0407 |
| 2021/0207795 | A1 | 7/2021 | Filkerson et al. | |
| 2022/0178644 | A1* | 6/2022 | Chang .................. | H05B 47/105 |
| 2022/0214134 | A1 | 7/2022 | Quek | |
| 2023/0258425 | A1* | 8/2023 | Chang ................... | F41A 21/325 102/502 |

* cited by examiner

MUZZLE FLASH SIMULATOR AND METHOD FOR GENERATING LIGHT TRAIL

CROSS-REFERENCE TO RELATED APPLICATION(S)

This application claims priority under 35 U.S.C. § 119(a) to and the benefit of Chinese Patent Application No. 202310613377.3, filed May 27, 2023, the entire disclosure of which is incorporated herein by reference.

TECHNICAL FIELD

This disclosure relates to the field of toy gun fittings, and in particular to a muzzle flame simulator and a method for generating a light trail.

BACKGROUND

At present, in an airsoft survival game/wargame, in order to simulate a muzzle flame effect of a real gun or to facilitate observation of a projectile flight trajectory, a muzzle flame simulator for a toy gun is often used to light up the projectile flight trajectory by a simulating flame light source on the muzzle flame simulator, or a tracer charger is used to light up by an ultraviolet lamp a tracer projectile that can absorb light energy such that the tracer projectile up can continue to glow for a while after the tracer projectile leaves the tracer charger, so as to achieve the purpose of displaying the projectile flight trajectory.

However, the traditional muzzle flame simulator usually has a single color with a single effect and requires the use of the tracer projectile to produce a luminous effect, which is costly.

SUMMARY

In a first aspect, a muzzle flame simulator is provided. The muzzle flame simulator is installed at a muzzle of a toy air gun. The muzzle flame simulator includes a projectile passage, a projectile sensor, a controller, and at least one simulating flame light source. The projectile passage is disposed inside the muzzle flame simulator and coaxial with a projectile flight trajectory. The projectile sensor is coupled to a controller and configured to send a trigger signal to the controller in response to detecting a projectile passing through the projectile passage. The controller includes a signal generator circuit, the signal generator circuit is configured to output at least two preset periodically changing control signals, and the at least two preset periodically changing control signals are respectively configured to control brightness, an on state, and an off state of at least two illuminating components with different colors. The signal generator circuit is a digital signal generator circuit or an analog signal generator circuit. The at least one simulating flame light source is coupled to the controller, where the at least one simulating flame light source each includes the at least two illuminating components with different colors. The at least two illuminating components are configured to periodically emit light of different colors and different intensities to the projectile based on the control signals, the light of different colors and different intensities are used to form a corresponding light trail based on a projectile flight trajectory. The controller is configured to start the signal generator circuit in response to detecting the trigger signal sent by the projectile sensor to enable the signal generator circuit to output the at least two preset periodically changing control signals and further enable the at least two illuminating components with different colors periodically emit light of different colors and intensities to the projectile based on the control signals.

In a second aspect, a method for generating a light trail is provided. The method for generating the light trail is applicable to a muzzle flame simulator. The muzzle flame simulator is installed at a muzzle of a toy air gun. The muzzle flame simulator includes a projectile passage, a projectile sensor, a controller, and at least one simulating flame light source. The projectile passage is disposed inside the muzzle flame simulator and coaxial with a projectile flight trajectory. The projectile sensor is coupled to a controller and configured to send a trigger signal to the controller in response to detecting a projectile passing through the projectile passage. The controller includes a signal generator circuit, the signal generator circuit is configured to output at least two preset periodically changing control signals, and the at least two preset periodically changing control signals are respectively configured to control brightness, an on state, and an off state of at least two illuminating components with different colors. The signal generator circuit is a digital signal generator circuit or an analog signal generator circuit. The at least one simulating flame light source is coupled to the controller, where the at least one simulating flame light source each includes the at least two illuminating components with different colors. The at least two illuminating components are configured to periodically emit light of different colors and different intensities to the projectile based on the control signals, the light of different colors and different intensities are used to form a corresponding light trail based on a projectile flight trajectory. The controller is configured to start the signal generator circuit in response to detecting the trigger signal sent by the projectile sensor to enable the signal generator circuit to output the at least two preset periodically changing control signals and further enable the at least two illuminating components with different colors periodically emit light of different colors and intensities to the projectile based on the control signals. The method for generating the light trail includes: generating, by the projectile sensor, a trigger signal in response to detecting a projectile passing through a projectile passage inside the muzzle flame simulator; stating the signal generator circuit in response to detecting, by the controller, the trigger signal sent by the projectile sensor, to output at least two preset periodically changing control signals, where the at least two preset periodically changing control signals are respectively configured to control brightness, an on state, and an off state of the at least two illuminating components with different colors; and the signal generator circuit is a digital signal generator circuit or an analog signal generator circuit; and periodically emitting, by the at least two illuminating components with different colors of each of the at least one simulating flame, light of different colors and intensities to the projectile based on the control signals, to form a corresponding light trail based on a projectile flight trajectory.

BRIEF DESCRIPTION OF THE DRAWINGS

In order to describe technical solutions in implementations of the disclosure more clearly, the following will give a brief introduction to the accompanying drawings required for describing implementations. Apparently, the accompanying drawings hereinafter described are merely some implementations of the disclosure. Based on these drawings, those of ordinary skill in the art can also obtain other drawings without creative effort.

DETAILED DESCRIPTION

The following will clearly and accurately illustrate technical solutions for implementations of the present disclosure with reference to accompanying drawings of implementations of the present disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

Figure 1:
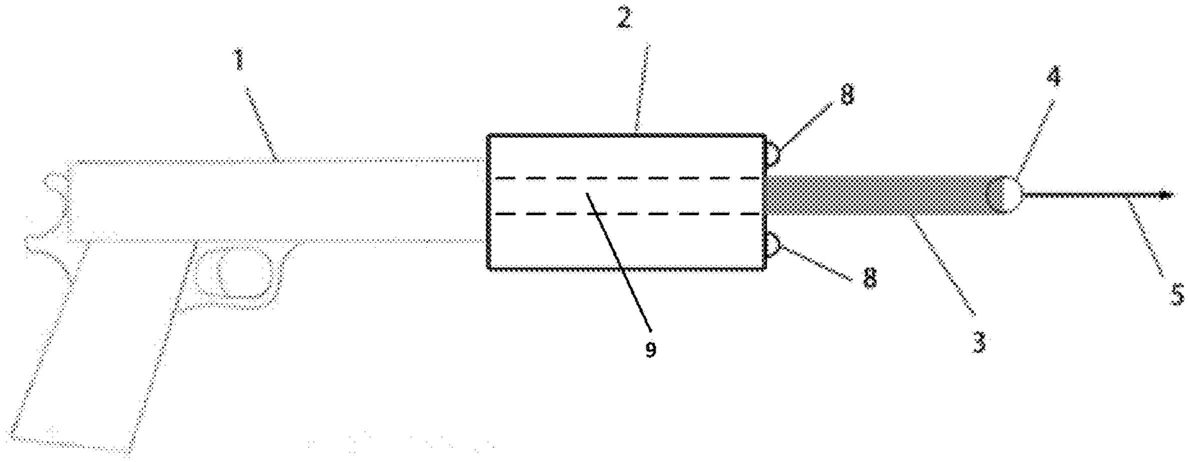
FIG. 1 is a schematic assembled structural diagram of a toy air gun and a muzzle flame simulator provided in an implementation of the present disclosure.
Figure 2:
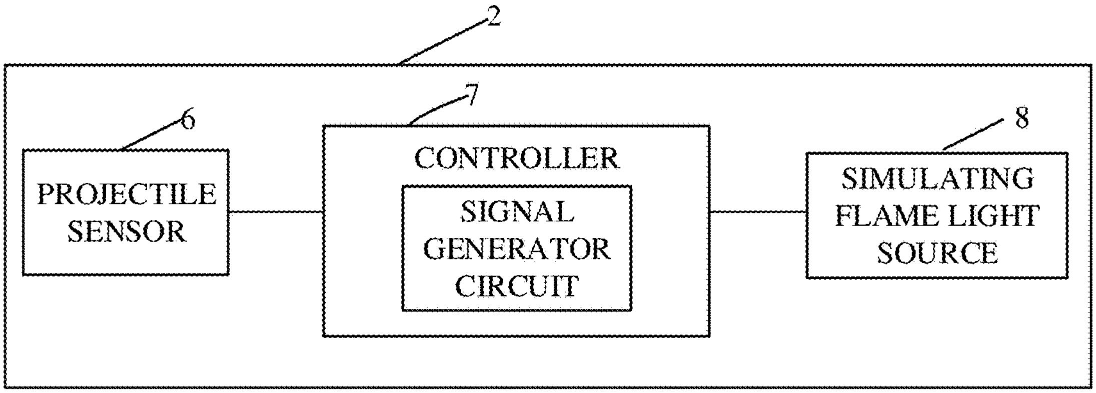
FIG. 2 is a schematic block diagram of a muzzle flame simulator provided in an implementation of the present disclosure.

In an implementation, as illustrated in FIG. 1 and FIG. 2, a muzzle flame simulator 2 is provided. The muzzle flame simulator 2 is installed at a muzzle of a toy air gun 1. The muzzle flame simulator 2 includes a projectile passage 9, a projectile sensor 6, a controller 7, and at least one simulating flame light source 8. The projectile passage 9 is disposed inside the muzzle flame simulator 2 and coaxial with a projectile flight trajectory 5. The projectile sensor 6 is coupled to a controller 7 and configured to send a trigger signal to the controller 7 in response to detecting a projectile passing through the projectile passage 9. The controller 7 includes a signal generator circuit, where the signal generator circuit is configured to output at least two preset periodically changing control signals. The at least two preset periodically changing control signals are respectively configured to control brightness, an on state, and an off state of at least two illuminating components with different colors. The signal generator circuit is a digital signal generator circuit or an analog signal generator circuit. The at least one simulating flame light source 8 is coupled to the controller 7, where the at least one simulating flame light source 8 each at least includes two illuminating components with different colors, and illuminating components are configured to periodically emit light of different colors to a projectile 4 based on the control signals to form a light trail 3. Specifically, the controller is configured to start the signal generator circuit in response to detecting the trigger signal sent by the projectile sensor 6 to enable the signal generator circuit to output the at least two preset periodically changing control signals and further enable the at least two illuminating components with different colors periodically emit light of different colors and intensities to the projectile based on the control signals. In the present disclosure, illuminating components with different colors are controlled by the controller. A period, phase difference, and positive voltage duration of adjacent control signals are set to generate waveforms of several periodically changing signals, where the several periodically changing signals are used to control illuminating components with different colors, so as to generate a rich combined color effect, simplify a control software, and reduce the requirements for the controller performance.

The toy air gun 1 may be one of a toy gun, a ball bullet (BB) gun, a foam dart blaster, a gel ball blaster, an air BB gun, a soft-air gun, or a paintball gun.

The muzzle flame simulator 2 may adopt a shape of a muzzle fitting such as a flash hider, a suppressor, a muzzle brake, or a silencer. The muzzle flame simulator 2 can be detachably connected to the muzzle, namely, an end of the barrel, of the toy air gun 1, for example, by means of clips, threaded connections, or the like, so as to allow for replacement and maintenance at any time.

The controller may be a printed circuit board (PCB) control circuit board, on which a control chip such as a microcontroller unit (MCU) and a single-chip microcomputer is arranged and configured with a corresponding control circuit. The controller is electrically connected with the simulating flame light source 8 and the projectile sensor 6, and may be able to control brightness, an on state, and an off state of the simulating flame light source 8 through the control chip.

The projectile sensor 6 may be a laser sensor, an optical fiber sensor, a thermal sensor, or the like.

In implementations of the present disclosure, the simulating flame light source 8 is configured to generate light of different colors, to periodically change the color of light under the control of the controller 7, and to illuminate light on the projectile 4 which is away from the muzzle flame simulator 2 and passes along the flight trajectory 5. Light of different colors is reflected into human eyes by the surface of the projectile 4. In this way, the light trail 3 with different colors can be obtained by an afterimage phenomenon on eyes.

Figure 3:
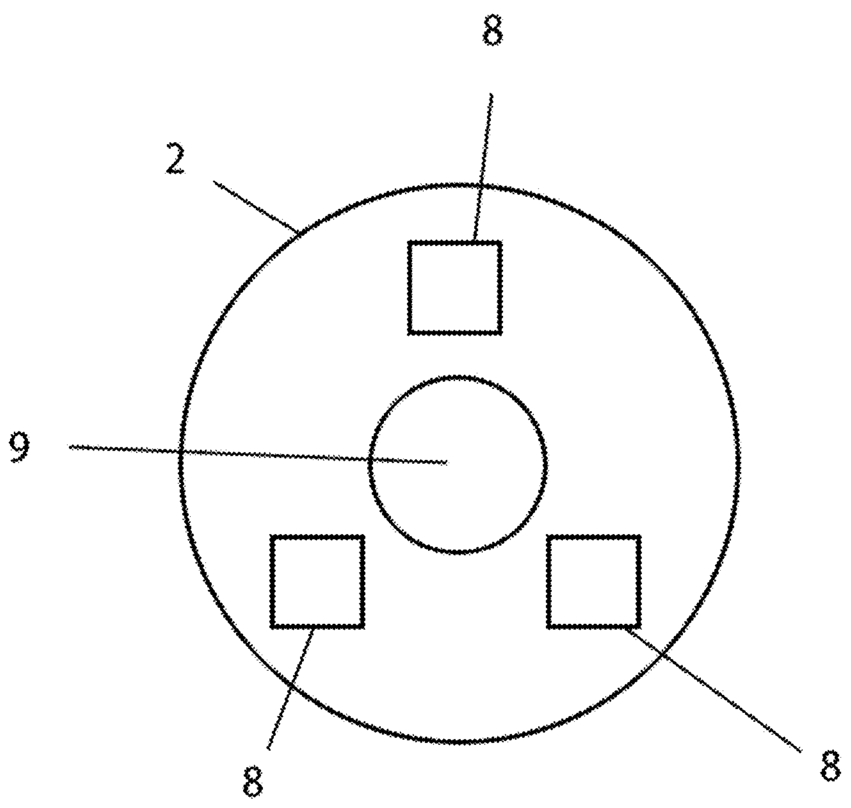
FIG. 3 is a left view of a muzzle flame simulator provided in an implementation of the present disclosure.
Figure 4:
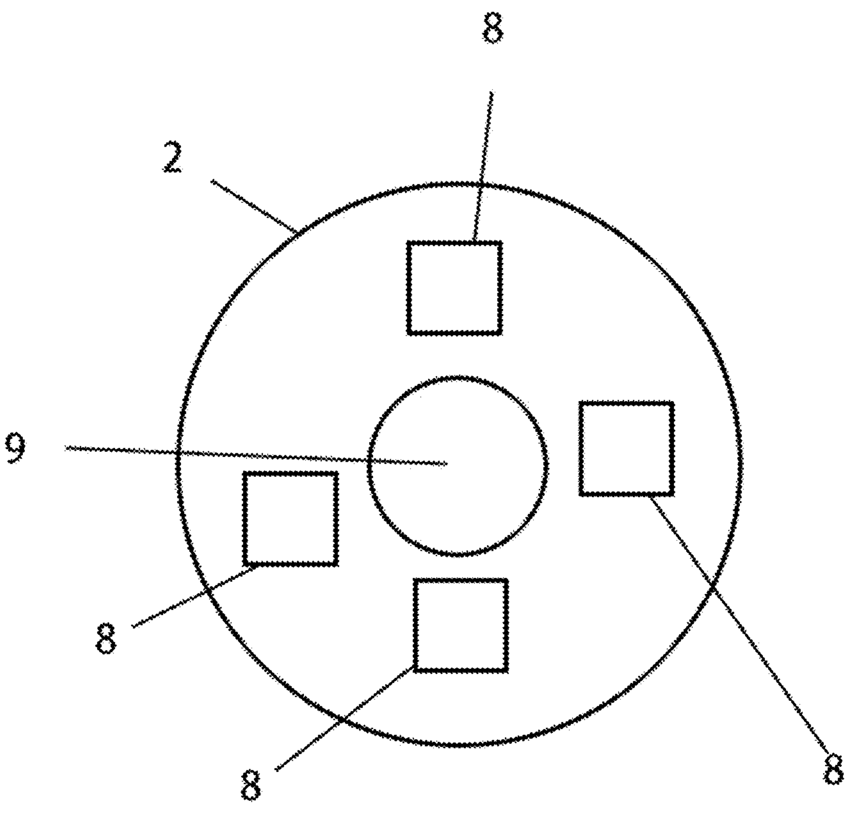
FIG. 4 is a left view of a muzzle flame simulator provided in another implementation of the present disclosure.
Figure 5:
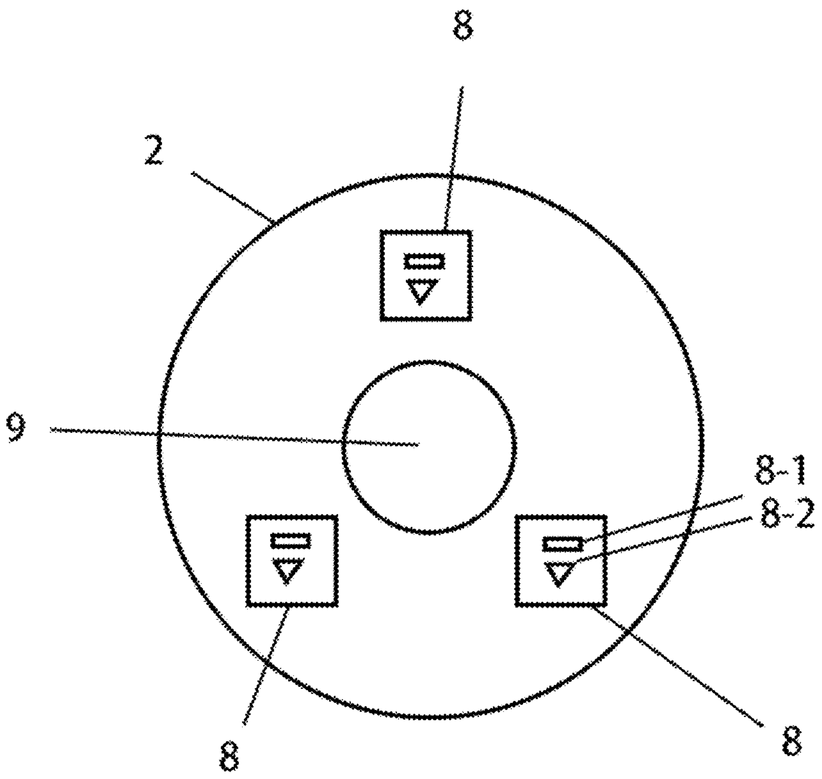
FIG. 5 is a left view of a muzzle flame simulator provided in another implementation of the present disclosure.
Figure 6:
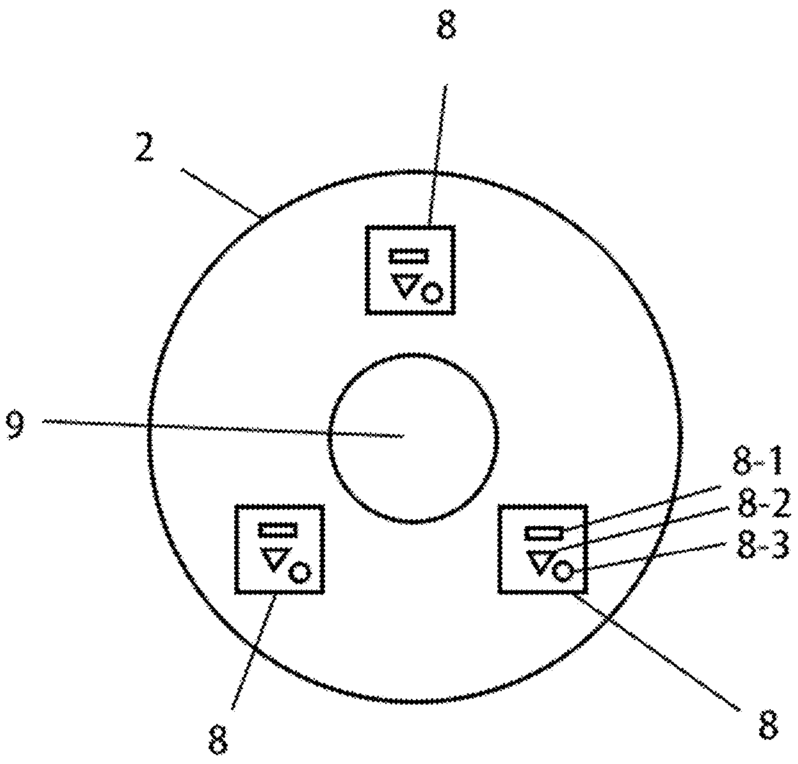
FIG. 6 is a left view of a muzzle flame simulator provided in another implementation of the present disclosure.

The muzzle flame simulator 2 includes at least one simulating flame light source 8 which may be disposed at the front end of the muzzle flame simulator 2, namely, the end close to the muzzle, and is disposed outside a projectile passage 9. Refer to FIG. 3, where FIG. 3 is a schematic structural diagram illustrating three simulating flame light sources 8. Refer to FIG. 4, where FIG. 4 is a schematic structural diagram illustrating four simulating flame light sources 8. The simulating flame light sources 8 may be disposed around the outside of the projectile passage 9 at equal intervals, and each simulating flame light source 8 has at least two illuminating components. Referring to FIG. 5, each simulating flame light source 8 has at least two illuminating components, which are a first illuminating component 8-1 and a second illuminating component 8-2 in FIG. 5. Referring to FIG. 6, each simulating flame light source 8 has three illuminating components, which are a first illuminating component 8-1, a second illuminating component 8-2, and a third illuminating component 8-3 in FIG. 6. As illustrated in FIG. 6, the first illuminating component 8-1, the second illuminating component 8-2, and the third illuminating component 8-3 are configured to respectively emit light of different colors such as a red light, a blue light, a green light, or the like.

The illuminating component may be a light-emitting diode (LED).

In implementations of the present disclosure, the controller 7 includes a signal generator circuit configured to output the at least two periodically changing control signals which are respectively configured to control brightness, an on state, and an off state of illuminating components with different colors. For example, the illuminating components include a first color illuminating component 8-1 and a second color illuminating component 8-2. The control signals include a first control signal and a second control signal. The first control signal is configured to the brightness, an on state, and an off state of the first color illuminating component 8-1. The second control signal is configured to the brightness, an on state, and an off state of the second color illuminating component 8-2.

It can be understood that the illuminating components may include at least two illuminating components with different colors. If the number of illuminating components is greater and the illumination brightness is greater, and if the number of colors of illuminating components is be greater, a combined colors effect will be richer.

The control signal may have a waveform of any one or any combination of a rectangular wave, a triangular wave, or a sine wave. The number of control signals is equal to the number of colors of illuminating components.

In an implementation scenario, when the toy air gun 1 is triggered, the projectile 4 is shoot to pass through the projectile passage 9, the projectile sensor 6 is triggered, then the projectile 4 is away from the projectile passage. When the controller 7 receives a trigger signal from the projectile sensor 6, control signals are generated by the signal generator circuit. Under the control of the control signals, illuminating components illuminate strong light on the projectile 4 away from the projectile passage 9. The strong light is reflected into human eyes by the surface of the projectile 4. In this way, the projectile light trajectory can be seen in the air. Since the control signals generated by the controller 7 change periodically, the luminous effect of illuminating components with different colors changes periodically under the control of the control signals while the projectile is flying, and the color of the projectile light trajectory also changes correspondingly. Due to the afterimage phenomenon on eyes, when a period of the control signal generated by the controller 7 is less than time of afterimage phenomenon on eyes, human can observe a long light trail consisting of small segments of different colors in series in the air, just like a rainbow.

The signal generator circuit may be a digital signal generator circuit or an analog signal generator circuit, which is configured to send at least two periodically changing control signals respectively configured to control brightness, an on state, and an off state of illuminating components with different colors. Control signals each periodically change and are output by a digital signal generator circuit or the analog signal generator circuit, which can be implemented more easily and save storage space compared with a technical solution implemented through more software instructions. The signal generator circuit is predesigned to at least two periodically changing control signals. When the controller 7 detects the trigger signal sent by the projectile sensor 6, the controller 7 starts the signal generator circuit, and the signal generator circuit output at least two preset periodically changing control signals according to presettings.

Figure 7:
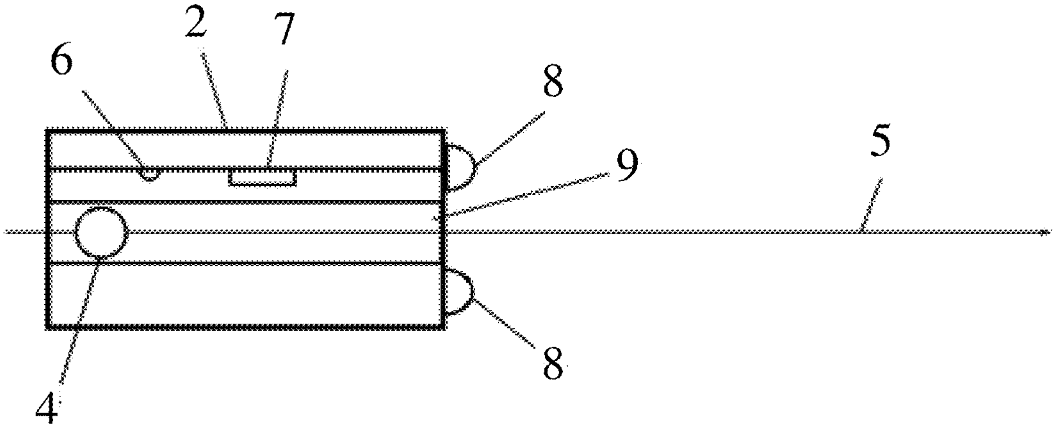
FIG. 7 is a schematic diagram illustrating a projectile starting to run provided in an implementation of the present disclosure.
Figure 8:
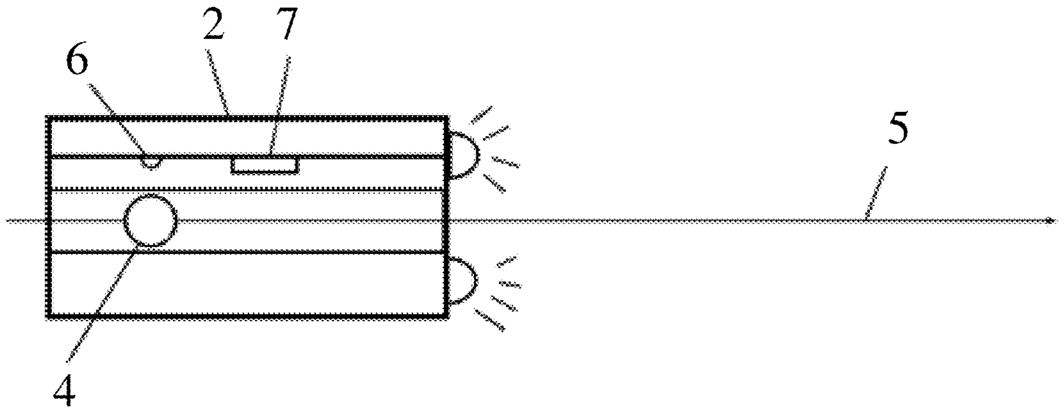
FIG. 8 is a schematic diagram illustrating a projectile being detected to pass through a projectile passage provided in an implementation of the present disclosure.
Figure 9:
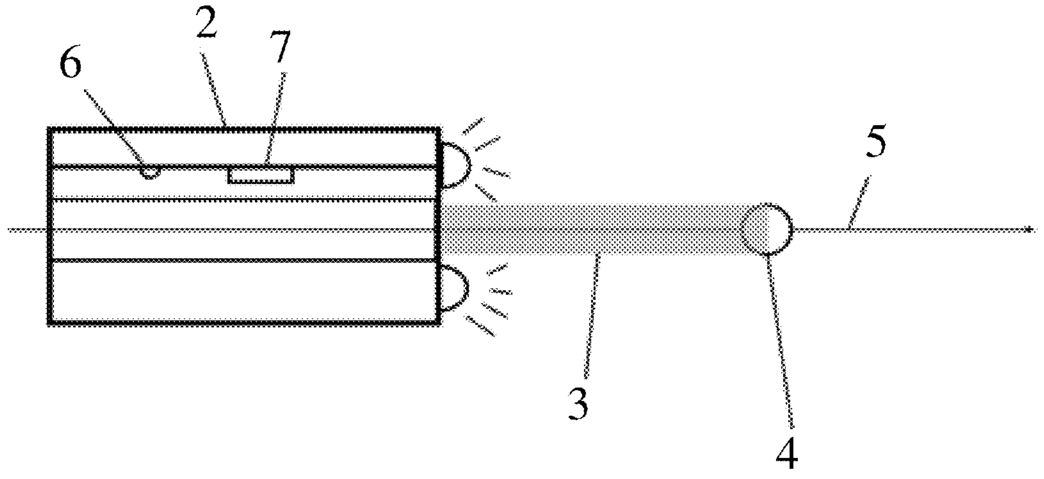
FIG. 9 is a schematic diagram illustrating a light trail being generated after a projectile leaves a projectile passage provided in an implementation of the present disclosure.

FIG. 7, FIG. 8, and FIG. 9 illustrates a process in which the projectile 4 passes through the projectile passage 9 of the muzzle flame simulator 2 and moves away from the muzzle flame simulator 2, after the projectile 4 is shoot along the flight trajectory 5. When detecting the pass of the projectile 4, the projectile sensor 6 sends a trigger signal to the controller 7 for turning on the signal generator circuit inside the controller 7. The signal generator circuit generates at least two periodically changing control signals for controlling the simulating flame light source 8 to periodically change colors of light.

In an implementation of the present disclosure, control signals output by the controller 7 change periodically. Exemplarily, when the controller 7 generates n control signals, the n control signals adopt the same signal period, for example, a period of the first control signal is equal to a period of the second control signal, a period of the second control signal is equal to a period of the third control signal, or the like, and a period of the (n−1)-th control signal is equal to a period of the nth control signal, where n is a positive integer.

In an implementation of the present disclosure, a proportion of a positive voltage duration to a period of the control signal remains constant in one period, namely, $$\frac{\text{a positive voltage duration}}{T}$$

is constant.

Exemplarily, the positive voltage duration is calculated by a following formula:

$$\frac{3T}{2n}$$

where T represents a period, T may be set to be less than 0.1 seconds since the time of the afterimage phenomenon on eyes is 0.1 to 0.4 seconds, n represents the number of colors of the illuminating components, and n is greater than 1.

In an implementation of the present disclosure, two adjacent control signals generated by the controller 7 have a phase difference between 0 and 180°, including 180°. These phase difference may be calculated by a following formula:

$$\frac{360^\circ}{n}$$

where n represents the number of colors of illuminating components, and n is greater than 1.

It can be understood that, when the controller 7 generates n control signals, the phase difference between every two adjacent control signals may all be $$\frac{360^\circ}{n},$$

for example, the phase difference between the second control signal and the first control signal is $$\frac{360^\circ}{n},$$

the phase difference between the third control signal and the second control signal is $$\frac{360^\circ}{n},$$

or the like, and the phase difference between the nth control signal and the (n−1)-th control signal is $$\frac{360^\circ}{n},$$

where n is a positive integer.

Since the time of the afterimage phenomenon on eyes is 0.1 to 0.4 seconds, when a period T of the control signal is less than the minimum time of the afterimage phenomenon on eyes, namely 0.1 seconds, human can observe the luminous effect generated by the muzzle flame simulator based on a rule in a period T of the control signal.

Figure 10:
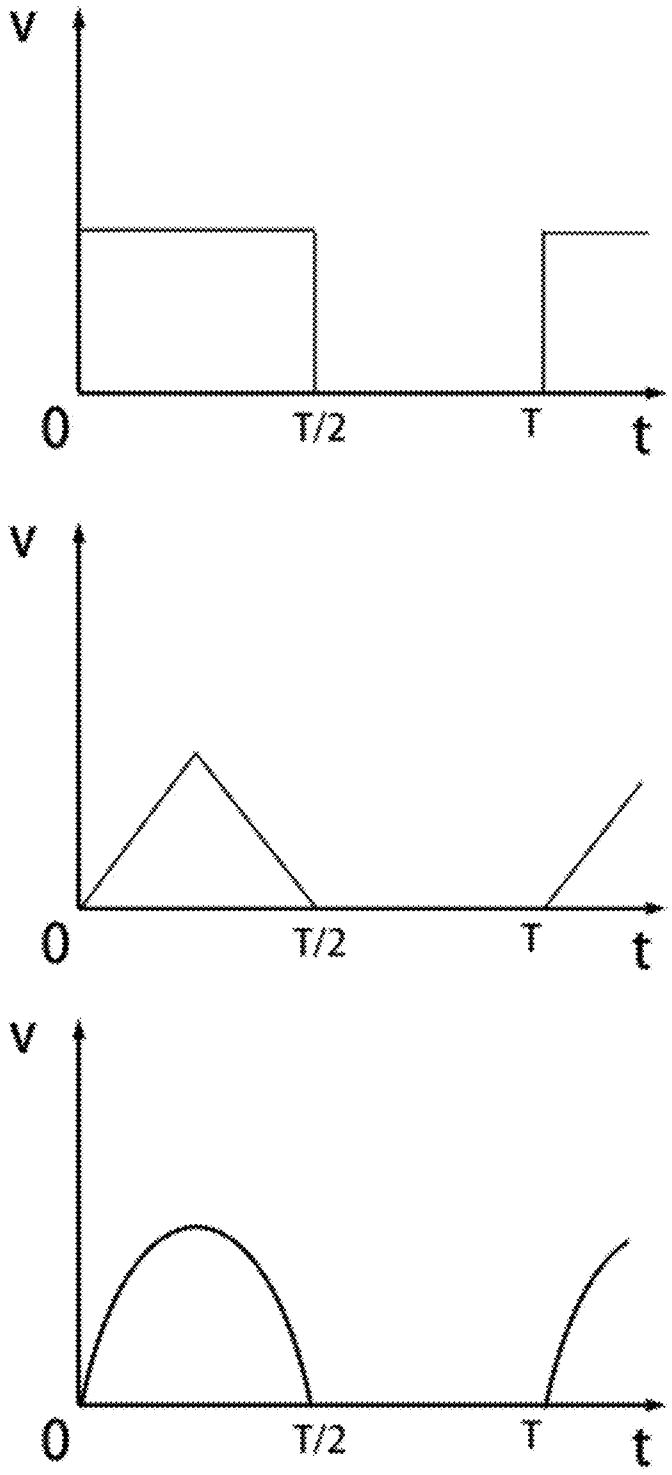
FIG. 10 is a signal waveform diagram of three waveforms of a control signal provided in an implementation of the present disclosure.

Referring to FIG. 10, in an implementation of the present disclosure, FIG. 10 illustrates signal waveform diagrams of different types of the control signals when the periods each are equal to T and the positive voltage time is equal to $$\frac{T}{2},$$

where an ordinate represents voltage V, an abscissa represents time t, and the waveform diagrams from top to bottom are respectively a positive voltage part of a rectangular wave signal, a positive voltage part of a triangular wave signal, and a positive voltage part of a sine wave signal. It can be understood that, because a negative voltage signal cannot be used as a valid control signal in practical implementation, the waveform diagram does not show the negative voltage part of the signal.

When the control signal may be the rectangular wave signal, the signal voltage has only two values, and the illuminating component controlled by the control signal has only two luminous states.

As an exemplary implementation, the control signal may be the triangular wave signal or the sine wave signal. The voltages of these two signals may change continuously over time, and countless voltage values can be generated. Therefore, the illuminating component controlled has countless luminous states. A color combination after mixing different colors of illuminating components is also countless, thus generating a more colorful light trail.

Figure 11:
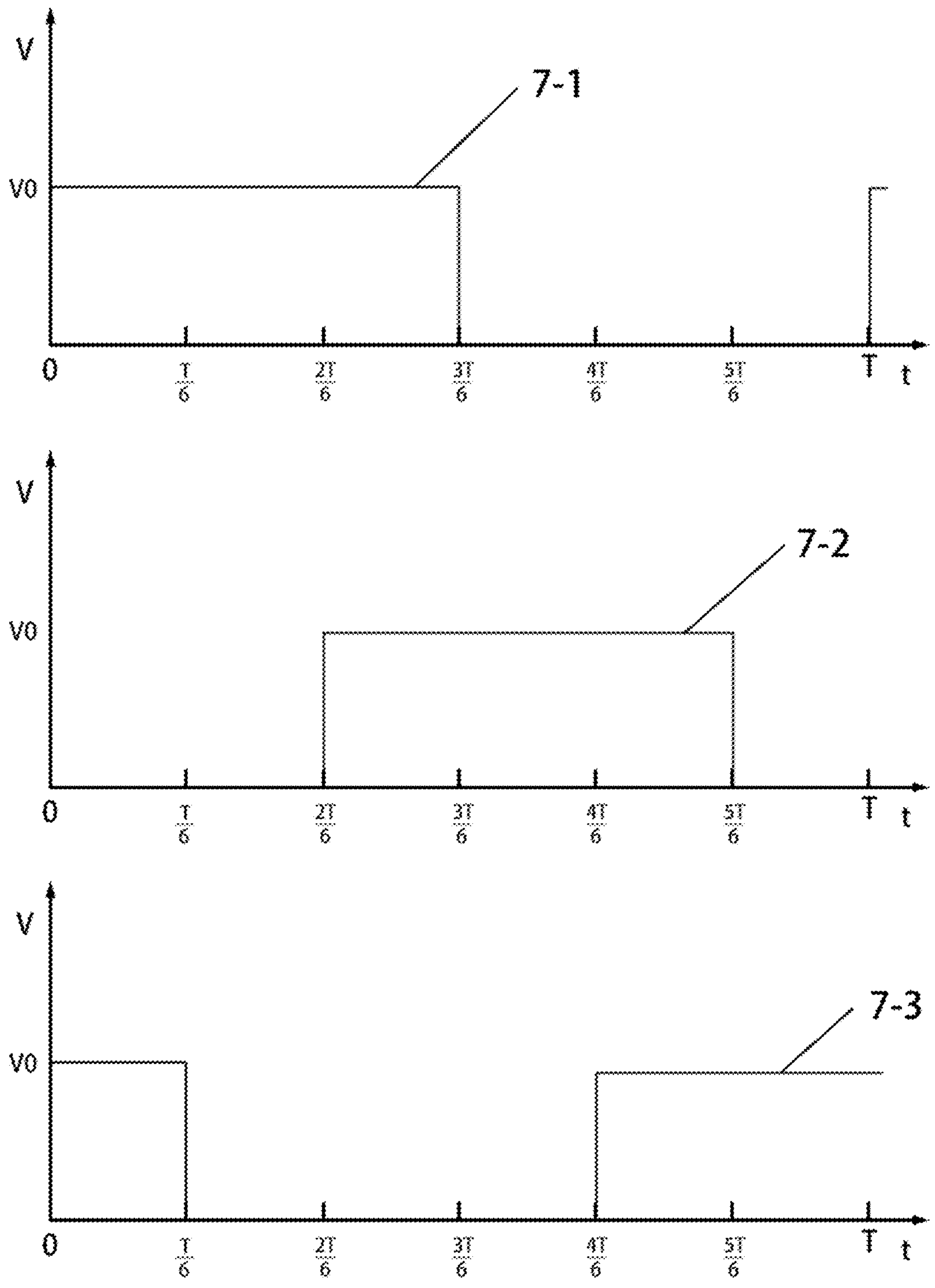
FIG. 11 is a signal waveform diagram illustrating three different control signals respectively output by a controller provided in an implementation of the present disclosure.

Referring to FIG. 11, FIG. 11 illustrates waveform diagrams of a control signal 7-1, a control signal 7-2, and a control signal 7-3, where the ordinate represents voltage V, and the abscissa represents time t. V0 is a starting voltage of the simulating flame light source 8, the control signal 7-1, the control signal 7-2, and the control signal 7-3 are three rectangular wave signals. Signal periods of the three rectangular wave signals are all T, which is less than 0.1 seconds and the three rectangular wave signals are configured to control the on-state and off-state of illuminating components of the simulating flame light source 8 as illustrated in FIG. 6. Specifically, the control signal 7-1 is configured to control the on state and off state of the first illuminating component 8-1, the control signal 7-2 is configured to control the on state and off state of the second illuminating component 8-2, and the control signal 7-3 is configured to control the on state and off state of the third illuminating component 8-3. Based on the positive voltage duration calculation formula $$\frac{3T}{2n},$$

the phase difference calculation formula $$\frac{360^\circ}{n},$$

the principle that the number of control signals is equal to the number of colors of illuminating components, and n being equal to 3, it can be calculated that the positive voltage durations of the control signal 7-1, the control signal 7-2, and the control signal 7-3 each are $$\frac{T}{2},$$

and the phase differences of the control signal 7-1, the control signal 7-2, and the control signal 7-3 each are 120°. Specifically, the phase difference between the control signal 7-2 and the control signal 7-1 is 120° and the positive voltage duration period of the control signal 7-1 is 0 to $$\frac{3T}{6}.$$

The phase difference between the control signal 7-3 and the control signal 7-2 is 120° and the positive voltage duration period of the control signal 7-2 is $$\frac{2T}{6} \text{ to } \frac{5T}{6}.$$

The phase difference between the control signal 7-1 and the control signal 7-3 is 120° and the positive voltage duration period of the control signal 7-3 is $$\frac{4T}{6} \text{ to } \frac{T}{6}$$

in the next period.

Figure 12:
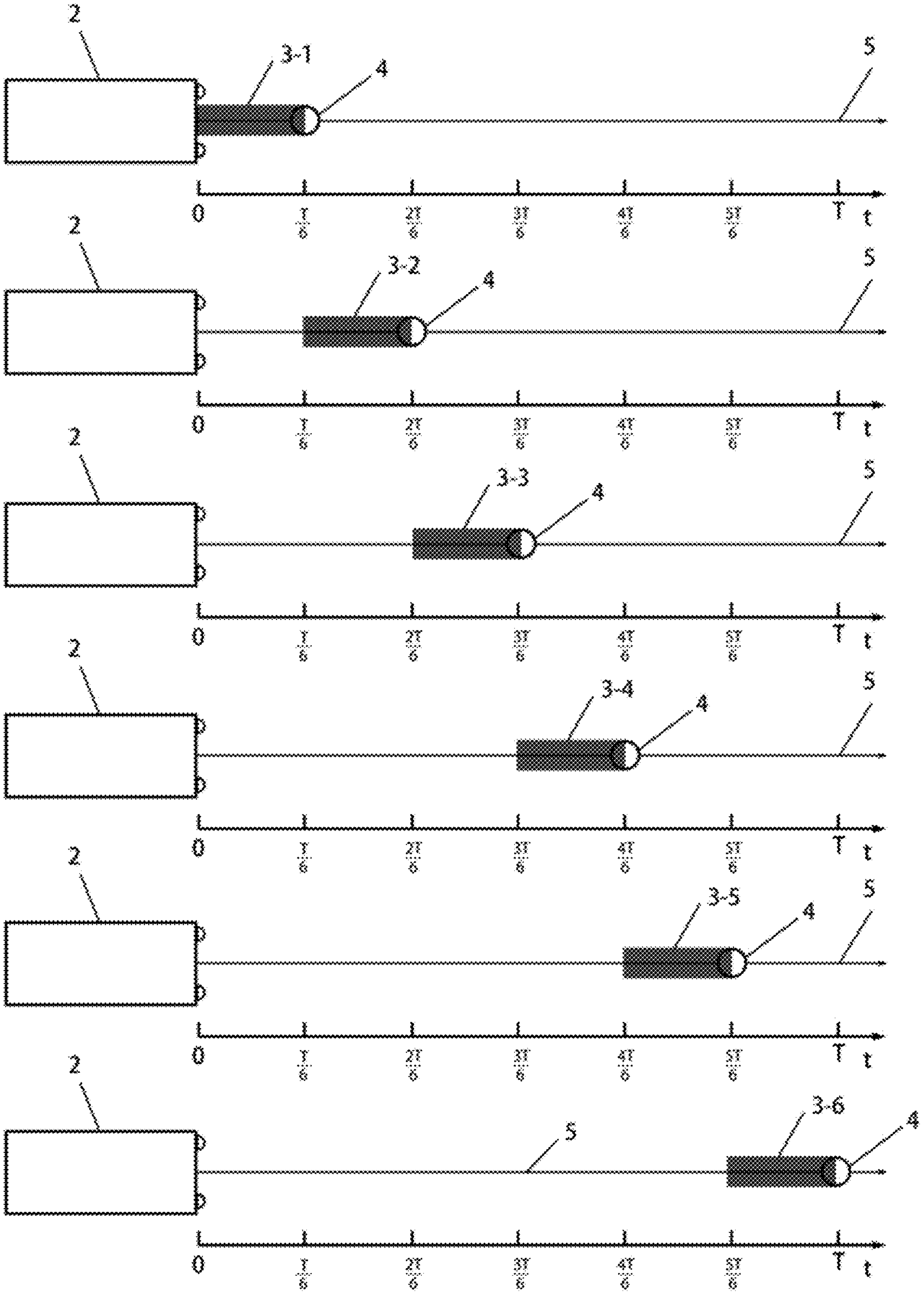
FIG. 12 is a schematic diagram of a mixed light trail generated by a controller outputting three different control signals respectively to control brightness, an on state, and an off state of an illuminating component provided in an implementation of the present disclosure.

Referring to FIG. 12, in the process of the projectile 4 passing through the muzzle flame simulator 2, flying along the flight trajectory 5, and leaving away from the muzzle flame simulator 2, three control signals each change periodically, and the color of the projectile 4 illuminated by illuminating components with three different colors under the control of three control signals respectively also change periodically. Specifically, in the period 0 to $$\frac{T}{6},$$

because the control signal 7-1 and the control signal 7-3 reach the starting voltage V0 of illuminating components, the first illuminating component 8-1 and the third illuminating component 8-3 will be illuminated for illuminating the projectile 4 away from the muzzle flame simulator 2, thus generating a light trail 3-1. In a period $$\frac{T}{6} \text{ to } \frac{2T}{6},$$

because the control signal 7-1 reaches the starting voltage V0 of illuminating component, the first illuminating component 8-1 will be illuminated for illuminating the projectile 4 away from the muzzle flame simulator 2, thus generating a light trail 3-2. In a period $$\frac{2T}{6} \text{ to } \frac{3T}{6},$$

because the control signal 7-1 and the control signal 7-2 reach the starting voltage V0 of illuminating components, the first illuminating component 8-1 and the second illuminating component 8-2 will be illuminated for illuminating the projectile 4 away from the muzzle flame simulator 2, thus generating a light trail 3-3. In a period $$\frac{3T}{6} \text{ to } \frac{4T}{6},$$

because the control signal 7-2 reaches the starting voltage V0 of illuminating component, the second illuminating component 8-2 will be illuminated for illuminating the projectile 4 away from the muzzle flame simulator 2, thus generating a light trail 3-4. In a period $$\frac{4T}{6} \text{ to } \frac{5T}{6},$$

because the control signal 7-2 and the control signal 7-3 reach the starting voltage V0 of illuminating components, the second illuminating component 8-2 and the third illuminating component 8-3 will be illuminated for illuminating the projectile 4 away from the muzzle flame simulator 2, thus generating a light trail 3-5. In a period $$\frac{5T}{6}$$

to T, because the control signal 7-3 reaches the starting voltage V0 of illuminating component, the third illuminating component 8-3 will be illuminated for illuminating the projectile 4 away from the muzzle flame simulator 2, thus generating a light trail 3-6. At the beginning of the next signal period T, the light trail is cycled from the light trail 3-1, so as to form a long light trail 3 of different colors end to end.

Figure 13:
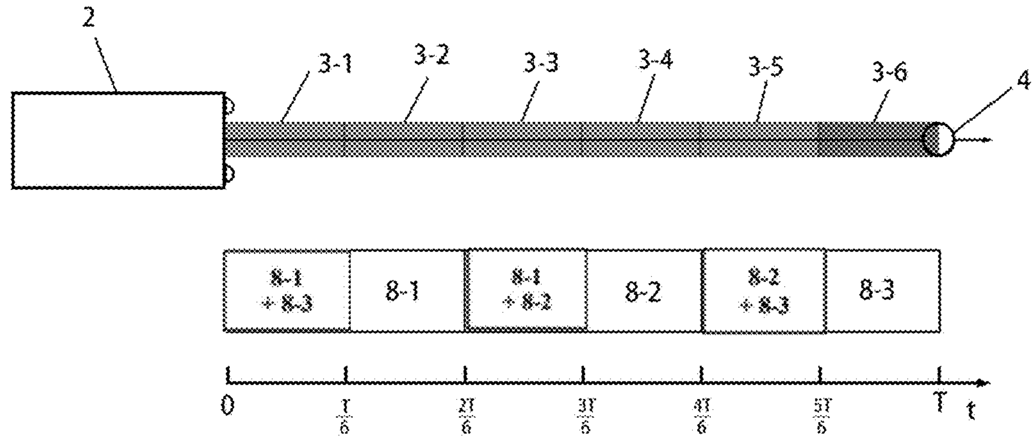
FIG. 13 is a schematic diagram illustrating periodic mixing of light trails provided in an implementation of the present disclosure.

Referring to FIG. 13, the projectile 4 flies at a certain speed and away from the flame simulator 2, and the light illuminated on the surface of the projectile 4 is reflected back into human eyes, so as to form a light trail. Due to the afterimage phenomenon on eyes, the user can observe the light trail 3-1, the light trail 3-2, the light trail 3-3, the light trail 3-4, the light trail 3-5, and the light trail 3-6 at the same time, all of which form a continuous light trail in the air. Since the first illuminating component 8-1, the second illuminating component 8-2, and the third illuminating component 8-3 have three different colors, the light trail 3-1, the light trail 3-2, the light trail 3-3, the light trail 3-4, the light trail 3-5 and the light trail 3-6 have different colors. Specifically, the light trail 3-1 is a color of superposition of the light generated by the first illuminating component 8-1 and the third illuminating component 8-3. The light trail 3-2 is a color of light generated by the first illuminating component 8-1. The light trail 3-3 is a color of superposition of the light generated by the first illuminating component 8-1 and the second illuminating component 8-2. The light trail 3-4 is a color of the light generated by the second illuminating component 8-2. The light trail 3-5 is a color of superposition of the light generated by the second illuminating component 8-2 and the third illuminating component 8-3. The light trail 3-6 is a color of the light generated by the third illuminating component 8-3. Therefore, referring to FIG. 5 and FIG. 13, in the present disclosure, within one signal period T, the projectile 4 can generate a long light trail 3 formed by six light trails of different colors connected end to end, just like a rainbow, under the illumination of the muzzle flame simulator 2 in one signal period T. For this reason, the long light trail 3 is also referred to as a rainbow light trail.

In the present disclosure, by arranging multiple illuminating components with different colors, the multiple illuminating components emit light with different colors and intensities to the projectile under the control of the controller. Since the control signals generated by the controller changes periodically, luminous effects of illuminating components with different colors change periodically under the control of the control signals while the projectile is flying, and the color of the projectile light trajectory also changes with time. Due to the afterimage phenomenon on eyes, when a period of the control signal generated by the controller is less than the time of afterimage phenomenon on eyes, human can simultaneously observe a long light trail consisting of small segments of different colors in series in the air, just like a rainbow, thus simplifying a control software, reducing the requirements for the controller performance, and reducing costs without using the tracer projectile.

Each module of the muzzle flame stimulator may be implemented wholly or partly by software, hardware, and combinations thereof. Each module may be embedded in or independent of a processor of the electronic device in the form of hardware or may be stored in a memory of the electronic device in the form of software so that the processor invokes the operations corresponding to the above modules.

Figure 14:
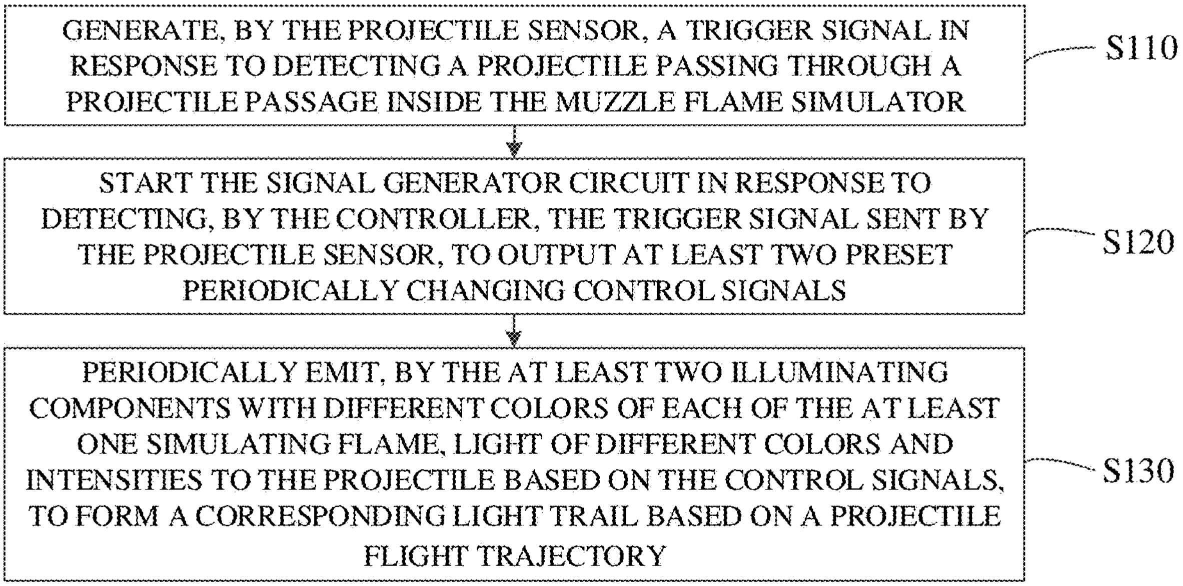
FIG. 14 is a schematic flowchart of a method for generating a light trail provided in an implementation of the present disclosure.

Referring to FIG. 14, FIG. 14 illustrates an implementation flowchart of a method for generating a light trail, which is applicable to the muzzle flame simulator. The method includes the following.

At S110, a trigger signal is generated in response to detecting a projectile passing through a projectile passage inside the muzzle flame simulator.

At S120, a signal generator circuit is started based on the trigger signal, and at least two preset periodically changing control signals are output by the signal generator circuit.

The signal generator circuit is configured, in advance, as a circuit that can output the at least two preset periodically changing control signals. When the controller detects the trigger signal sent by the projectile sensor, the controller starts the signal generator circuit, and the signal generator circuit output at least two preset periodically changing control signals according to presetting.

At S130, light of different colors and intensities is periodically emitted to the projectile based on the control signals, so as to form a corresponding light trail based on a projectile flight trajectory.

In implementations of the present disclosure, the pre-set projectile sensor is configured to detect the projectile passage in real-time and send the trigger signal to the controller in response to detecting a projectile passing through the projectile passage. At the same time, the controller outputs at least two periodically changing control signals by the signal generator circuit. Under the control of the control signals, illuminating components illuminate strong light on the projectile away from the projectile passage. The strong light is reflected into human eyes by the surface of the projectile. In this way, the projectile light trajectory can be seen in the air. Since the control signals generated by the controller each change periodically, the luminous effect of illuminating components with different colors changes periodically under the control of the control signals while the projectile is flying, and the color of the projectile light trajectory also changes with time. Due to the afterimage phenomenon on eyes, when a period of the control signal generated by the controller is less than the time of afterimage phenomenon on eyes, human can simultaneously observe a long light trail of a small segment of different colors in series in the air, just like a rainbow.

In implementations of the present disclosure, at least two periodically changing control signals are output based on the trigger signal, including that periods, phase differences, and positive voltage durations of the control signals are configured based on the trigger signal, so as to generate and output at least two periodically changing control signals.

Specifically, different types of toy air guns and different types of projectiles may result in different projectile flight trajectories, for example, the difference in flight height, flight length, flight arc, or the like. Therefore, when control signals are configured, types of toy air guns and types of projectiles can be obtained, and the periods, phase differences, and positive voltage durations are configured correspondingly so that the light trail can have different flight trajectories adapted to different projectiles.

In the present disclosure, by arranging multiple illuminating components with different colors, the multiple illuminating components with different colors emit light with different colors and intensities to the projectile under the control of the controller. Since the control signals generated by the controller each change periodically, the luminous effect of illuminating components with different colors changes periodically under the control of the control signal while the projectile is flying, and the color of the projectile light trajectory also changes with time. Due to the afterimage phenomenon on eyes, when a period of the control signal generated by the controller is less than the time of afterimage phenomenon on eyes, human can simultaneously observe a long light trail consisting of a small segment of different colors in series in the air, just like a rainbow, thus simplifying a control software, reducing the requirements for the controller performance, and reducing costs without using the tracer projectile.

It should be understood that, in various implementations described herein, the magnitude of a sequence number of each step does not mean an order of execution, and the order of execution of each process should be determined by its function and internal logic and shall not constitute any limitation to an implementation process of implementations.

It will be evident to those skilled in the art that, for the sake of convenience and simplicity, the above division of functional units and modules described herein is just illustrative. In an actual implementation, the foregoing functions may be allocated to and implemented by different functional units and modules according to actual needs. In other words, an internal structure of the apparatus is divided into different functional units or modules to implement all or a part of the functions described herein.

The above implementations are only used for illustrating technical solutions of the disclosure and are not intended to limit technical solutions of the disclosure. Although the present disclosure is described in detail with reference to the foregoing implementations, those skilled in the art should understand that they may still make modifications to technical solutions described in the foregoing implementations or make equivalent replacements to some technical features described in the foregoing implementations. Any modifications or replacements made within the spirit and scope of the disclosure shall also fall within the protection scope of the disclosure.

I claim:

1. A muzzle flame simulator, wherein the muzzle flame simulator is installed at a muzzle of a toy air gun, comprising:

- a projectile passage disposed inside the muzzle flame simulator, the projectile passage being coaxial with a projectile flight trajectory;
- a projectile sensor coupled to a controller and configured to send a trigger signal to the controller in response to detecting a projectile passing through the projectile passage;
- the controller comprising a signal generator circuit, wherein the signal generator circuit is configured to output at least two preset periodically changing control signals, and the at least two preset periodically changing control signals are respectively configured to control brightness, an on state, and an off state of at least two illuminating components with different colors; and the signal generator circuit is a digital signal generator circuit or an analog signal generator circuit; and
- at least one simulating flame light source coupled to the controller, wherein the at least one simulating flame light source each comprises the at least two illuminating components with different colors, and the at least two illuminating components are configured to periodically emit light of different colors and different intensities to the projectile based on the at least two preset periodically changing control signals, the light of different colors and different intensities are used to form a corresponding light trail based on a projectile flight trajectory;

wherein the controller is configured to start the signal generator circuit in response to detecting the trigger signal sent by the projectile sensor to enable the signal generator circuit to output the at least two preset periodically changing control signals and further enable the at least two illuminating components with different colors periodically emit light of different colors and intensities to the projectile based on the at least two preset periodically changing control signals;

wherein for each of the at least two preset periodically changing control signals, the control signal contains a positive voltage signal, a duration of the positive voltage signal is calculated by a formula:

$$\frac{3T}{2n}$$

T represents a period of the control signal, T is less than 0.1 seconds, n represents the number of colors of the illuminating components, and n is greater than 1;

wherein a phase difference between two adjacent control signals among the at least two preset periodically changing control signals is calculated by a formula:

$$\frac{360°}{n}.$$

2. The muzzle flame simulator of claim 1, wherein for each of the at least two preset periodically changing control signals, a proportion of the duration of the positive voltage signal to a period of the control signal remains constant.

3. The muzzle flame simulator of claim 2, wherein the period of the control signal is less than time of an afterimage phenomenon on eyes.

4. The muzzle flame simulator of claim 2, wherein the at least two preset periodically changing control signals have a same period.

5. The muzzle flame simulator of claim 1, wherein each of the at least two the control signal has a waveform of any one or any combination of a rectangular wave, a triangular wave, or a sine wave.

6. The muzzle flame simulator of claim 1, wherein the toy air gun may be any one of a toy gun, a ball-bearing (BB) gun, a soft-projectile gun, a water-projectile gun, an air BB gun, a soft-air gun, or a paintball gun.

7. The muzzle flame simulator of claim 1, wherein the number of control signals is equal to the number of colors of illuminating components in a simulating flame light source.

8. A method for generating a light trail, applicable to a muzzle flame simulator, wherein the muzzle flame simulator comprises:

a projectile passage disposed inside the muzzle flame simulator, the projectile passage being coaxial with a projectile flight trajectory;

a projectile sensor coupled to a controller and configured to send a trigger signal to the controller in response to detecting a projectile passing through the projectile passage;

the controller comprising a signal generator circuit, wherein the signal generator circuit is configured to output at least two preset periodically changing control signals, and the controller is configured to start the signal generator circuit in response to detecting the trigger signal sent by the projectile sensor to control the signal generator circuit to output the at least two preset periodically changing control signals; and at least one simulating flame light source coupled to the controller, wherein the at least one simulating flame light source each comprises the at least two illuminating components with different colors, and the at least two illuminating components with different colors are configured to periodically emit light of different colors to the projectile based on the at least two preset periodically changing control signals to form a light trail;

wherein the method comprises:

generating, by the projectile sensor, a trigger signal in response to detecting a projectile passing through a projectile passage inside the muzzle flame simulator;

starting the signal generator circuit in response to detecting, by the controller, the trigger signal sent by the projectile sensor, to output at least two preset periodically changing control signals, wherein the at least two preset periodically changing control signals are respectively configured to control brightness, an on state, and an off state of the at least two illuminating components with different colors; and the signal generator circuit is a digital signal generator circuit or an analog signal generator circuit; and periodically emitting, by the at least two illuminating components with different colors of each of the at least one simulating flame, light of different colors and intensities to the projectile based on the at least two preset periodically changing control signals, to form a corresponding light trail based on a projectile flight trajectory;

wherein for each of the at least two preset periodically changing control signals, the control signal contains a positive voltage signal, a duration of the positive voltage signal is calculated by a formula:

$$\frac{3T}{2n}$$

T represents a period of the control signal, T is less than 0.1 seconds, n represents the number of colors of the illuminating components, and n is greater than 1;

wherein a phase difference between two adjacent control signals among the at least two preset periodically changing control signals is calculated by a formula $$\frac{360°}{n}.$$

9. The method of claim 8, wherein for each of the at least two preset periodically changing control signals, in each period, a proportion of the duration of a positive voltage signal to a period of the control signal remains constant.

10. The method of claim 9, wherein the period of the control signal is less than time of an afterimage phenomenon on eyes.

11. The method of claim 9, wherein the at least two preset periodically changing control signals have a same period.

12. The method of claim 8, wherein each of the at least two the control signal has a waveform of any one or any combination of a rectangular wave, a triangular wave, or a sine wave.

13. The method of claim 8, wherein the toy air gun may be any one of a toy gun, a ball bullet (BB) gun, a foam dart blaster, a gel ball blaster, an air BB gun, a soft-air gun, or a paintball gun.

14. The method of claim 8, wherein the number of control signals is equal to the number of colors of illuminating components in a simulating flame light source.

* * * * *